(12) United States Patent
Takahashi

(10) Patent No.: US 7,787,207 B2
(45) Date of Patent: Aug. 31, 2010

(54) HEAD CONTROL METHOD, CONTROL DEVICE, AND STORAGE DEVICE

(75) Inventor: Tetsuya Takahashi, Kawasaki (JP)

(73) Assignee: Toshiba Storage Device Corporation, Tokyo (JP)

(*) Notice: Subject to any disclaimer, the term of this patent is extended or adjusted under 35 U.S.C. 154(b) by 162 days.

(21) Appl. No.: 12/263,134

(22) Filed: Oct. 31, 2008

(65) Prior Publication Data
US 2009/0122435 A1 May 14, 2009

(30) Foreign Application Priority Data
Nov. 14, 2007 (JP) .................... 2007-295864

(51) Int. Cl.
G11B 5/60 (2006.01)
(52) U.S. Cl. .................................. 360/75
(58) Field of Classification Search .......... None
See application file for complete search history.

(56) References Cited

U.S. PATENT DOCUMENTS

| | | | |
|---|---|---|---|
| 6,501,606 B2 * | 12/2002 | Boutaghou et al. .......... 360/75 |
| 6,853,508 B2 * | 2/2005 | Smith et al. .................. 360/75 |
| 7,068,458 B2 * | 6/2006 | Huang et al. ................. 360/75 |
| 7,097,110 B2 * | 8/2006 | Sheperek et al. ............ 236/1 C |
| 7,239,471 B2 | 7/2007 | Tanabe |
| 7,301,715 B2 * | 11/2007 | Huang et al. ................. 360/75 |
| 7,440,217 B2 * | 10/2008 | Ono et al. ..................... 360/75 |
| 7,460,327 B2 * | 12/2008 | Iwase ........................... 360/75 |
| 7,477,470 B2 * | 1/2009 | Leis et al. .................... 360/75 |
| 7,518,818 B2 * | 4/2009 | Yamazaki et al. ............ 360/75 |
| 7,542,228 B2 * | 6/2009 | Knigge et al. ................ 360/75 |
| 2003/0058559 A1 * | 3/2003 | Brand et al. ................. 360/75 |
| 2006/0119974 A1 | 6/2006 | Yamazaki et al. |
| 2009/0153995 A1 * | 6/2009 | Jang ............................ 360/31 |

FOREIGN PATENT DOCUMENTS

| JP | A 2006-164388 | 6/2006 |
|---|---|---|
| JP | A 2006-190374 | 7/2006 |

* cited by examiner

Primary Examiner—Hoa T Nguyen
Assistant Examiner—James L Habermehl
(74) Attorney, Agent, or Firm—Greer, Burns & Crain, Ltd.

(57) ABSTRACT

It is related to a head control method. The head control method controls a protruding flying height of a head in which an energization amount applied to a heater element in the head to thermally expands the head. The head control method includes a resistance-value measuring step of measuring a resistance value of the storage element, an energization-amount calculating step of calculating an energization amount applied to the heater element such that the resistance value measured in the resistance-value measuring step reaches a reference resistance value, and a heater control step of performing control to apply the energization amount calculated in the energization-amount calculating step to the heater element.

15 Claims, 15 Drawing Sheets

| RADIAL POSITION | INNER SIDE | CENTER | OUTER SIDE |
|---|---|---|---|
| REFERENCE RESISTANCE VALUE [mOhm] | 800 | 1000 | 1200 |

| RADIAL POSITION | INNER SIDE | CENTER | OUTER SIDE |
|---|---|---|---|
| INITIAL ENERGIZATION AMOUNT [mW] | 20 | 30 | 40 |
| ENERGIZATION AMOUNT DURING OPERATION [mW] | 35 | 40 | 45 |

| ENVIRONMENTAL TEMPERATURE [°C] | ENERGIZATION AMOUNT [mW] | EFFECTIVE FLAG |
|---|---|---|
| ⋮ | ⋮ | ⋮ |
| 11~15 | 10 | 0 |
| 16~20 | 15 | 1 |
| 21~25 | 20 | 0 |
| 26~30 | 25 | 0 |
| 31~35 | 30 | 0 |
| ⋮ | ⋮ | ⋮ |

HEAD CONTROL METHOD, CONTROL DEVICE, AND STORAGE DEVICE

BACKGROUND OF THE INVENTION

1. Field of the Invention

The embodiments discussed herein are directed to a head control method, a control device, and a storage device for controlling, by applying an energization amount to a heater element and thermally expanding a head element, a position of the head element that is opposed to a storage medium and can read out a signal, and, more particularly to a head control method, a control device, and a storage device that can accurately control, for respective heads, an energization amount applied to a heater element in any temperature environment and maintain a head element in a desired target flying height.

2. Description of the Related Art

Conventionally, as a method of controlling a clearance amount between a head element in a magnetic disk device and the surface of a magnetic disk (hereinafter referred to as a "flying height"), there is known a method of controlling a thermal expansion amount of the head element by changing an energization amount applied to a heater element in a head.

FIG. 18 is a diagram for explaining a method in the past for controlling a flying height. In an example shown in FIG. 18, before an energization amount is applied to a heater element, a flying height of a head 12a is lower than a flying height of a head 12b. Such a difference between the flying height is caused by individual variation in magnetic disk devices. In this case, as shown in FIG. 18, in order to set the flying height of the heads 12a and 12b to a target flying height, an energization amount applied to the heater element is controlled. Specifically, since a thermal expansion amount of a head element increases as an energization amount applied to the heater element is raised, an energization amount applied to the head 12b is controlled to be larger than an energization amount applied to the head 12a.

The control of a flying height is required to be highly accurate control with an extremely small error with respect to the target flying height. This is because, when an error occurs in the control of a flying height, a probability of collision of the head element and the surface of the magnetic disk increases and, because of occurrence of thermal asperity, a head output attenuates and head noise increases. In particular, in recent years, a flying height is designed to be extremely small due to an increase in magnetic storage density of a magnetic disk. Therefore, control of the flying height must be more highly accurate.

As described above, since the head element thermally expands, an amount of thermal expansion of the head element is different depending on the temperature (environmental temperature) in the magnetic disk device. In other words, even if the same energization amount is applied to the heater elements, the thermal expansion amount of the head element increases as the environmental temperature rises and the flying height becomes smaller than an intended flying height. Therefore, it is difficult to highly accurately control the flying height of the head element. Under a situation in which highly accurate control of a flying height is required, it is important to control a flying height taking into account the environmental temperature.

Therefore, several techniques for controlling a flying height taking into account environmental temperature have been proposed. For example, Japanese Patent Laid-Open No. 2006-164388 (hereinafter, Patent Document 1) discloses a technique for controlling an energization amount applied to a heater element according to environmental temperature measured by a temperature sensor (a thermistor, etc.) in a magnetic disk device. This makes it possible to control an energization amount taking into account thermal expansion of the head element.

Japanese Patent Laid-Open No. 2006-190374 (hereinafter, Patent Document 2) discloses a technique for controlling an energization amount applied to a heater element according to an amount of change in a resistance value of the magnetic resistance effect element. This technique makes use of the fact that the resistance value of a magnetic resistance effect element (a reproduction element) in a head changes according to environmental temperature.

However, with the technique disclosed in Patent Document 1, when a temperature gradient of environmental temperature is steep, a temperature difference occurs between the temperature sensor and the head and the temperature of the head cannot be accurately measured. As a result, a target energization amount cannot be calculated. This is specifically explained with reference to FIG. 19. As shown in FIG. 19, a magnetic disk device 1 disclosed in Patent Document 1 calculates, when environmental temperature is low, a thermal expansion amount of a head element 12c from environmental temperature measured by a thermistor and determines an energization amount applied to a heater element taking into account the calculated thermal expansion amount. As shown in FIG. 19, when the environmental temperature rises, the magnetic disk device 1 determines an energization amount applied to the heater element taking into account a thermal expansion amount of the head element 12c in a high-temperature environment.

Thereafter, as shown in FIG. 19, when the environmental temperature falls, the thermistor measures low temperature. The magnetic disk device 1 determines an energization amount on the basis of a measured value of the thermistor. However, even if the magnetic disk device 1 changes to a low-temperature environment, the temperature of the head element 12c does not immediately fall. In other words, regardless of the fact that the environmental temperature is low, it is likely that the head element 12c will still thermally expand and stay in the high-temperature state for some time. In such a state, if an energization amount the same as that in the low-temperature environment is applied to the heater element, the head element 12c excessively expands and collides with the magnetic disk 11.

The technique disclosed in Patent Document 2 is not suitable for using the magnetic resistance effect element (the reproduction element) as a temperature sensor. Specifically, this is because, when the magnetic resistance effect element is a GMR (Giant Magneto Resistive) element, a resistance value of the magnetic resistance effect element tends to change because of disturbances other than the environmental temperature. This is because the GMR element is formed in multiple layers and has a delicate structure. When the magnetic resistance effect element is a TuMR (Tunneling Magneto Resistive) element, since the TuMR element is formed by an insulating layer, there is almost no change in a resistance value with respect to a change in the environmental temperature. The TuMR element has large individual variation. Moreover, a relation between a resistance change and a temperature change is not linear in the TuMR element. Therefore, regardless of whether the magnetic resistance effect element is the GMR element or the TuMR element, it is impossible to accurately measure the environmental temperature and it is difficult to accurately control an energization amount.

An object of embodiments of the present invention is to solve the problems of the techniques in the past and it is an object of the present invention to provide a head control method, a control device, and a storage device that can accurately control, for respective heads, an energization amount applied to heater elements under any temperature environment and maintain head elements in a target flying height.

SUMMARY

In accordance with an aspect of embodiments, a head control method controls a protruding flying height, which is a distance between a head having a storage element that is opposed to a storage medium, by applying an energization amount to a heater element in the head to thermally expand the head. The head control method includes a resistance-value measuring step of measuring a resistance value of the storage element, and an energization-amount calculating step of calculating an energization amount applied to the heater element such that the resistance value measured in the resistance-value measuring step reaches a reference resistance value. The reference value is a resistance value of the storage element in a state in which an energization amount necessary for setting the protruding flying height to a target value is applied to the heater element under specific environmental temperatures. The method also includes a heater control step of performing control to apply the energization amount calculated in the energization-amount calculating step to the heater element.

DETAILED DESCRIPTION OF THE EMBODIMENTS

Embodiments of the present invention are explained in detail below with referenced to the accompanying drawings. In the embodiments explained below, as an example, the present invention is applied to a magnetic disk device. However, the embodiments are also effective in other storage devices such as a thermal magnetic disk device and an optical magnetic disk device.

First Embodiment

First, an overview of head control processing by a magnetic disk device according to a first embodiment of the present invention is explained. The magnetic disk device according to the first embodiment considers the point that a resistance value of a storage element changes according to environmental temperature, and applies an energization amount to a heater element on the basis of the change in resistance value of the storage element.

The resistance value of the storage element increases as the temperature of the storage element rises. Thus, resistance value of the storage element is larger as the environmental temperature is higher. In other words, when the resistance value of the storage element is large, this indicates that the environmental temperature is high. Similarly, as the energization amount applied to the heater element increases, since the temperature of the storage element is higher, the resistance value of the storage element is larger, as well.

Therefore, the magnetic disk device according to the first embodiment measures, during manufacturing, resistance values of the storage element under specific environmental temperatures and determines a heater element energization amount necessary for setting a flying height to a target value (hereinafter referred to as reference resistance value). The reference resistance value is a resistance value at the time when the flying height reaches the target value.

The magnetic disk device periodically measures, during a normal operation, a resistance value of the storage element. When the resistance value measured by the magnetic disk device (hereinafter referred to as measured resistance value) is different from the reference resistance value, the magnetic disk device determines that the environmental temperature is different from specific environmental temperature at the time when the reference resistance value was measured and controls an energization amount applied to the heater element.

At this point, the magnetic disk device controls the energization amount so that the measured resistance value reaches the referenced resistance value. This is because, as described above, when a resistance value of the storage element is the reference resistance value, the temperature of the storage element will reach the desired temperature for setting the flying height to the target value.

Figure 1A:
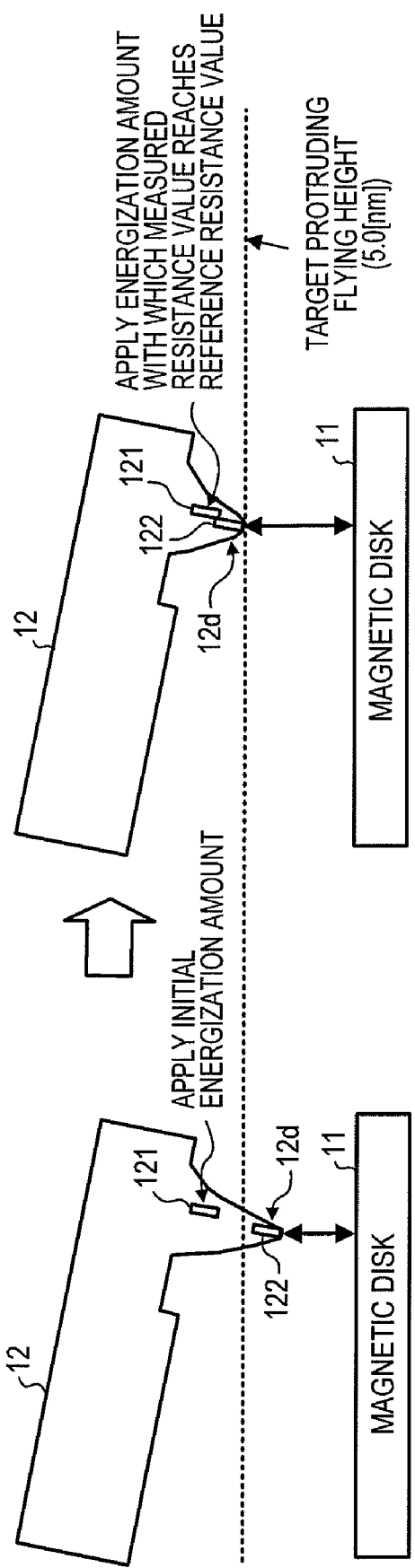
FIG. 1A is a diagram for explaining an overview of head control processing by a magnetic disk device in a high-temperature environment.

The overview described above is specifically explained. FIG. 1A is a diagram for explaining an overview of head control processing by the magnetic disk device in a high-temperature environment. When the environmental temperature is higher than the room temperature, a head element 12*d* thermally expands more than it does at room temperature and projects toward the magnetic disk 11 side. When an initial energization amount is applied to a heater element 121, as shown in FIG. 1A, a flying height is lower than a target flying height. In this case, it is likely that the head element 12*d* collides with the magnetic disk 11.

Figure 1B:
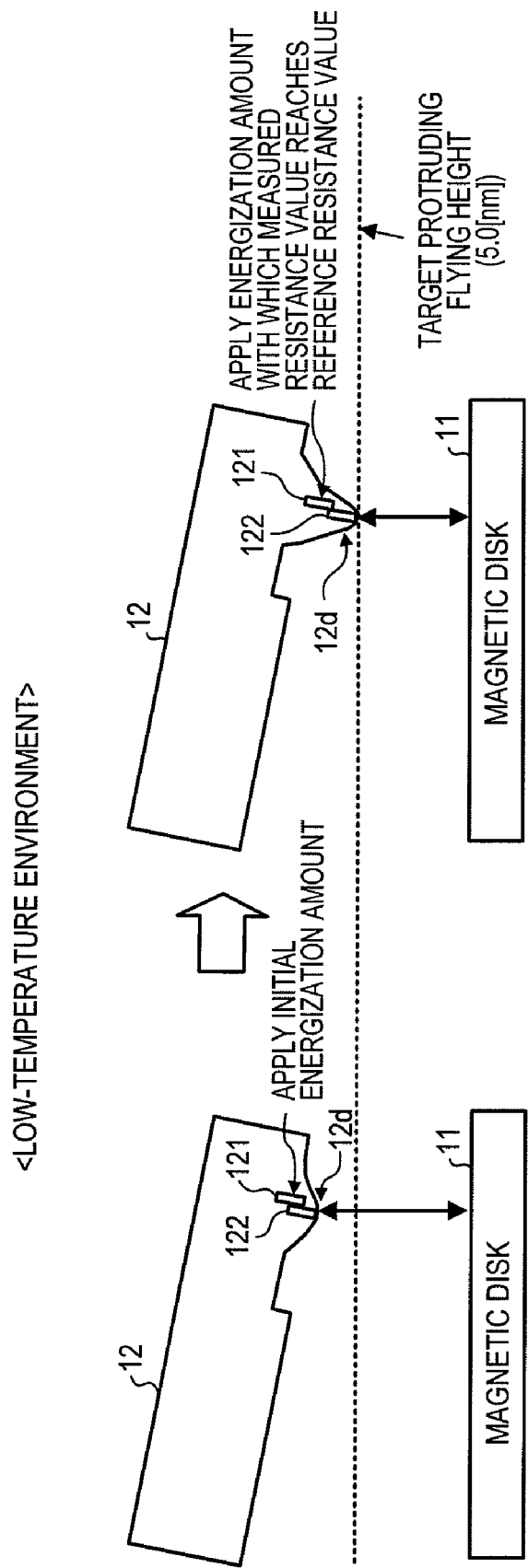
FIG. 1B is a diagram for explaining an overview of head control processing by the magnetic disk device in a low-temperature environment.

FIG. 1B is a diagram for explaining an overview of head control processing by the magnetic disk device in a low-temperature environment. When the environmental temperature is lower than room temperature, a protruding amount of the head element 12*d* decreases. When the initial energization amount is applied to the heater element 121, as shown in FIG. 1B, the flying height is higher than the target flying height. It is likely that a storage element 122 cannot correctly store data in the magnetic disk 11. In this case, too, it is also likely that a not-shown reproduction element cannot accurately scan data stored in the magnetic disk 11.

Figure 2:
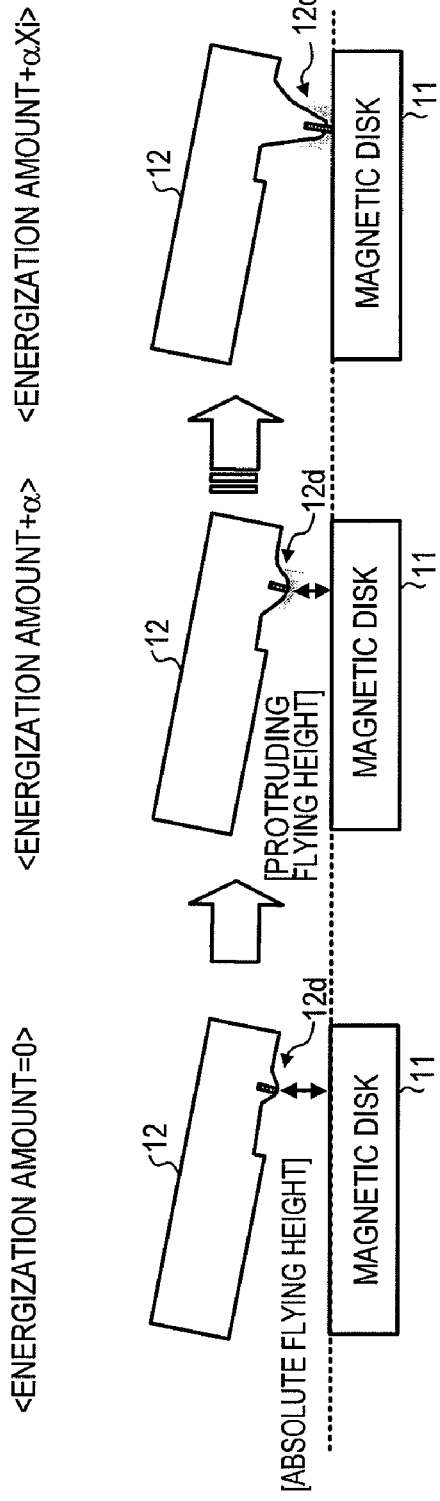
FIG. 2 is a diagram showing transition of a flying height at the time when an energization amount applied to a heater element is increased.

Therefore, in order to take into account a flying height that changes according to environmental temperature, the magnetic disk device calculates the reference resistance value and the like in advance during manufacturing before shipment. Specifically, the magnetic disk device measures an output level of a reproduction signal read by the head element 12*d* while stepwise increasing an energization amount applied to the heater element 121 from "0" by a predetermined control width (in FIG. 2, indicated by "α") under a room temperature environment as shown in FIG. 2. The environmental temperature does not always have to be the room temperature. However, the reference resistance value is calculated under the room temperature environment.

When the output level of the reproduction signal does not increase any more and is saturated, the magnetic disk device reduces the energization amount applied to the heater element 121 to "0". This is because a peak value of the output level is at a lowest point of the head element 12*d*, i.e., the head element 12*d* and the magnetic disk 11 collide with each other. The flying height of the head element and the output level of the reproduction signal have a proportional relation.

In the following explanation, a distance between the vicinity of the head element 12*d* and the lowest point (a point of the peak value of the output level) of the head element 12*d* under the room temperature environment and at the time when the energization amount applied to the heater element 121 is "0" is referred to as absolute flying height. A distance between the vicinity of the head element 12*d* thermally expanded by the application of the energization amount to the heater element 121 and the lowest point of the head element 12*d* is referred to as protruding flying height (see FIG. 2).

Figure 3:
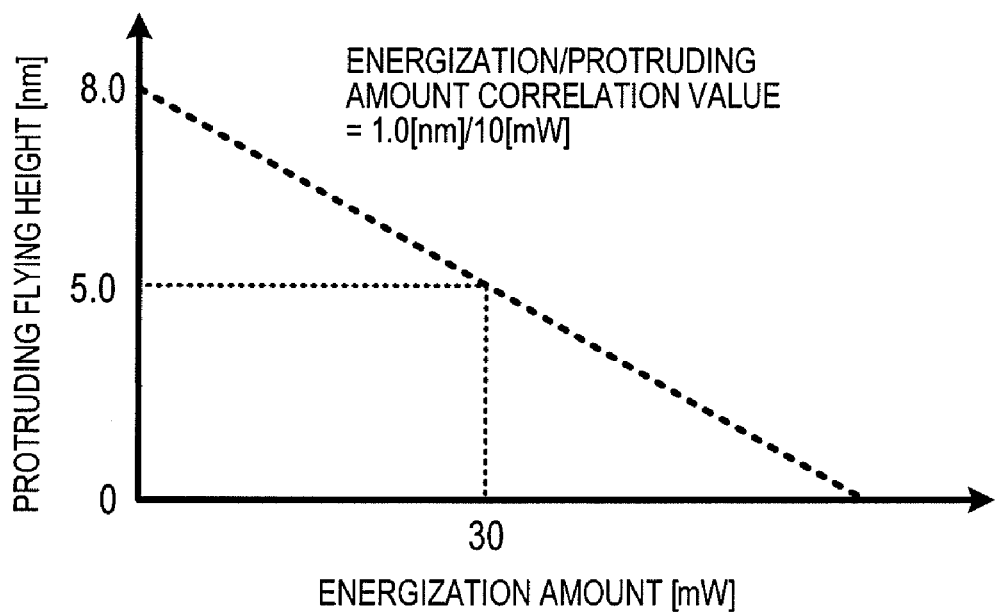
FIG. 3 is a graph showing an example of an energization/protruding amount correlation value.

When the magnetic disk device finishes measuring the output level of the reproduction signal, the magnetic disk device calculates a protruding flying height from the output level of the reproduction signal using a Wallace formula and calculates a correlation value between the energization amount and the protruding flying height (hereinafter referred to as energization/protruding amount correlation value"). FIG. 3 is a graph showing an example of the energization/protruding amount correlation value. In the example shown in FIG. 3, the magnetic disk device calculates 1.0 [nm (nanometer)]/10 [mW (milliwatt)] as the energization/protruding amount correlation value.

The magnetic disk device calculates, using the calculated energization/protruding amount correlation value, an energization amount to the heater element 121 necessary for setting the protruding flying height to a target value (hereinafter referred to as initial energization amount). Thereafter, the magnetic disk device measures a resistance value of the storage element 122 when the initial energization amount is applied to the heater element 121 at room temperature (a reference resistance value). In the example shown in FIG. 3, when a target protruding flying height is 5.0 [nm], the magnetic disk device calculates 30 [mW] as the initial energization amount using the energization/protruding amount correlation value.

The "target protruding flying height" in this context indicates an optimum protruding flying height with which the head element 12*d* can normally apply write processing and read processing to the magnetic disk 11. In recent years, the target protruding flying height is set to, for example, about 5.0 [nm] to 10.0 [nm].

Figure 4:
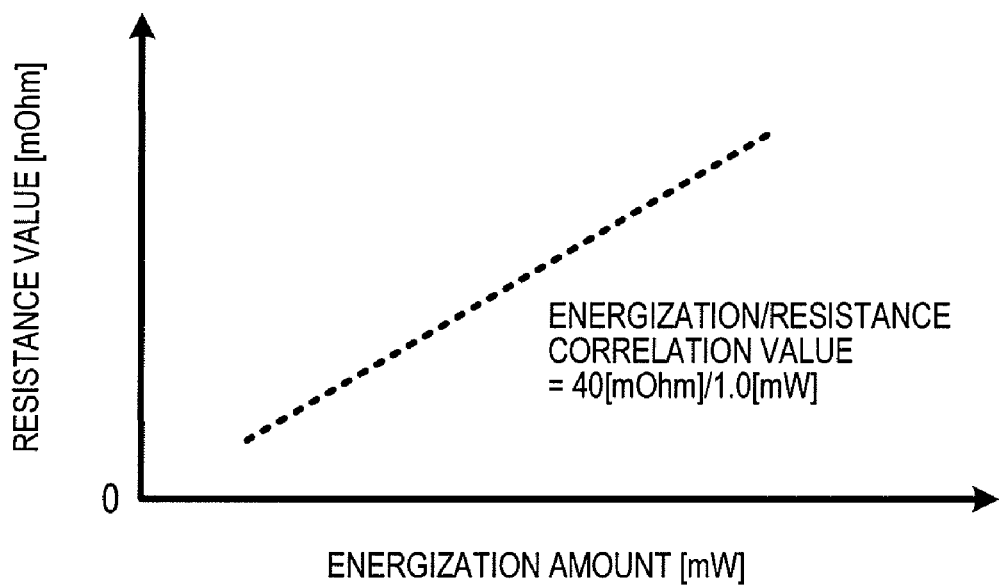
FIG. 4 is a graph showing an example of an energization/resistance correlation value.

The magnetic disk device measures a resistance value of the storage element 122 while gradually increasing the energization amount applied to the heater element 121 from "0" by predetermined control width under the room temperature environment and calculates a correlation value between the energization amount applied to the heater element 121 and the resistance value of the storage element 122 (hereinafter referred to as energization/resistance correlation value). FIG. 4 is a graph showing an example of the energization/resistance correlation value. In the example shown in FIG. 4, the magnetic disk device calculates 40 [mOhm (milliohm)]/1.0 [mW] as the energization/resistance correlation value.

The initial energization amount, the reference resistance value, and the energization/resistance correlation value explained above are values calculated by the magnetic disk device during manufacturing. The magnetic disk device performs head control processing after shipment using these values.

Specifically, the magnetic disk device measures, in idling during a normal operation, a resistance value of the storage element 122 by applying the initial energization amount to the heater element 121. The magnetic disk device calculates, using the energization/resistance correlation value, an energization amount with which the measured resistance value reaches the reference resistance value.

For example, in the example shown in FIG. 1A, when it is assumed that the measured resistance value is 1400 [mOhm], the magnetic disk device calculates an energization amount such that the measured resistance value 1400 [mOhm] reaches the reference resistance value 1000 [mOhm]. Since the energization/resistance correlation value is 40 [mOhm]/1.0 [mW], in order to reduce 400 [mOhm] (1000-1400), which is a difference between the reference resistance value and the measured resistance value, the magnetic disk device calculates an energization amount 20 [mW] by subtracting 10 [mW] from the initial energization amount 30 [mW]. It is assumed that the reference resistance value, the initial energization amount, and the energization/resistance correlation value are the values shown in FIGS. 3 and 4.

The magnetic disk device stores the calculated energization amount in a predetermined storage unit and applies the stored energization amount to the heater element 121 in performing write processing or read processing. In this way, the magnetic disk device reduces a thermal expansion amount of the head element, which increases as environmental temperature rises, by reducing the energization amount applied to the heater element 121 to be smaller than the initial energization amount.

Consequently, even under the high-temperature environment, it is possible to control the protruding flying height to the target value 5.0 [nm]. As a result, it is possible to prevent the head element 12d from colliding with the magnetic disk 11.

In the example shown in FIG. 1B, as in the example shown in FIG. 1A, the magnetic disk device measures a resistance value of the storage element 122 and controls an energization amount applied to the heater element 121. For example, when it is assumed that the measured resistance value is 600 [mOhm], in order to increase 400 [mOhm] (1000-600), which is a difference between the reference resistance value and the measured resistance value, the magnetic disk device calculates an energization amount 40 [mW] by adding 10 [mW] to the initial energization amount 30 [mW].

The magnetic disk device stores the calculated energization amount in the predetermined storing unit and applies the stored energization amount to the heater element 121 in performing write processing or read processing. In this way, when the measured resistance value is smaller than the reference resistance value, the magnetic disk device increases a thermal expansion amount of the head element, which decreases as environmental temperature falls, by increasing the energization amount applied to the heater element 121 to be larger than the initial energization amount.

Consequently, it is possible to control the protruding flying height to the target value even in a low-temperature environment. As a result, it is possible to prevent a situation in which the storage element 122 cannot accurately store data in the magnetic disk 11 or the not-shown reproduction element cannot accurately read data stored in the magnetic disk 11.

Figure 5:
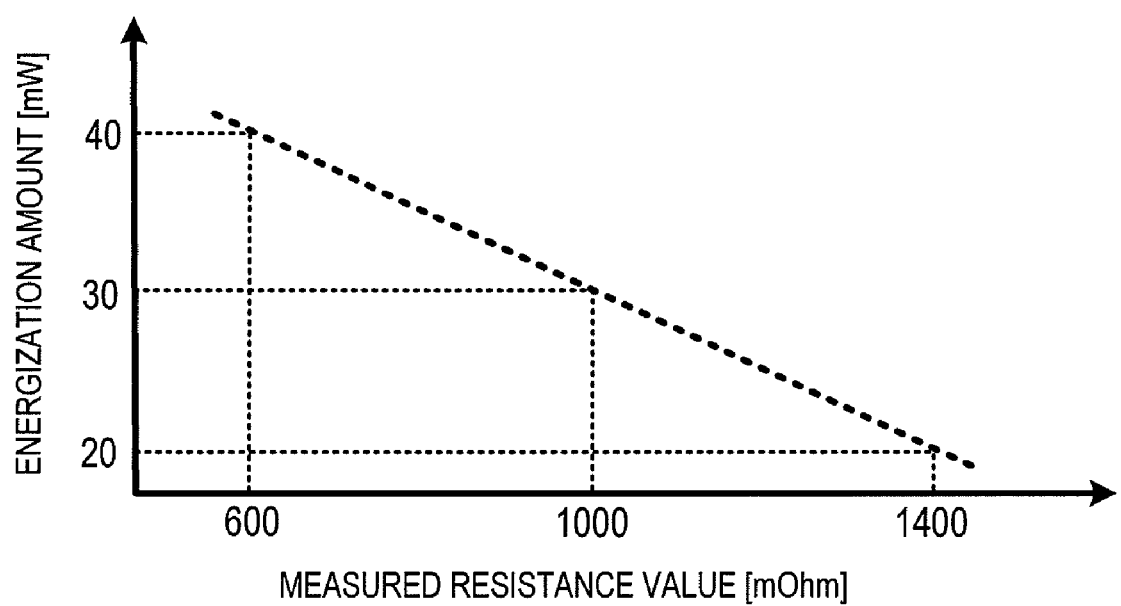
FIG. 5 is a graph showing a relation between a measured resistance value and an energization amount applied to the heater element.

FIG. 5 is a graph showing a relation between the measured resistance value and the energization amount applied to the heater element 121. As shown in FIG. 5, the relation between the measured resistance value and the energization amount applied to the heater element 121 can be linearly represented. Therefore, the magnetic disk device according to the first embodiment can easily calculate an energization amount applied to the heater element 121 simply by measuring a resistance value of the storage element 122.

In this way, the magnetic disk device according to the first embodiment controls an energization amount applied to the heater element 121 according to a resistance value of the storage element 122, without measuring environmental temperature with a thermistor or the like. Therefore, even when the environmental temperature suddenly changes, it is possible to calculate an energization amount suitable for the environmental temperature. Since the storage element 122 is manufactured by mainly using Cu (Copper), a change in a resistance value of the storage element 122 with respect to temperature is represented by an extremely simple linear function. Therefore, the storage element 122 is suitably used as a temperature sensor. Therefore, the magnetic disk device according to the first embodiment can accurately control, for the respective heads, an energization amount applied to the heater element 121 under any temperature element and maintain a protruding flying height of the head 12 at the target value. The magnetic disk device can calculate initial energization amount, the reference resistance value, and the energization/resistance correlation value without maintaining a particular environmental temperature. Therefore, an external apparatus, a manufacturing environment, and the like for changing the environmental temperature are unnecessary and it is possible to reduce manufacturing cost.

Figure 6:
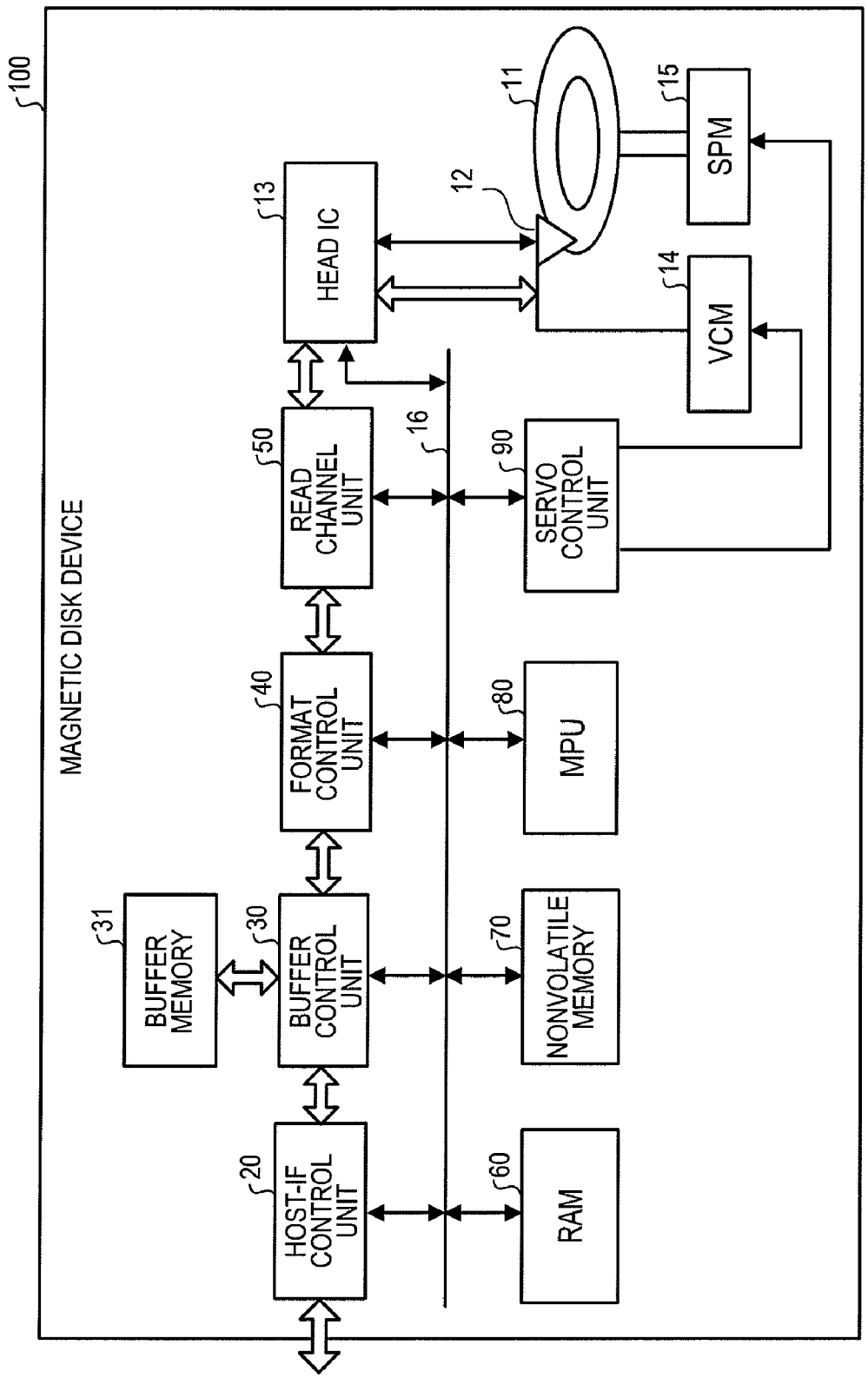
FIG. 6 is a block diagram showing a schematic configuration of a magnetic disk device according to a first embodiment of the present invention.

A schematic configuration of the magnetic disk device according to the first embodiment is explained. FIG. 6 is a block diagram showing the schematic configuration of the magnetic disk device according to the first embodiment. As shown in FIG. 6, a magnetic disk device 100 according to the first embodiment includes a magnetic disk 11, a head 12, a head IC 13, a voice coil motor (hereinafter referred to as VCM) 14, a spindle motor (hereinafter referred to as SPM) 15, a shared bus 16, a host-interface control unit (hereinafter referred to as host-IF control unit) 20, a buffer control unit 30, a buffer memory 31, a format control unit 40, a read channel unit 50, a RAM (random access memory) 60, a nonvolatile memory 70, an MPU (micro processing unit) 80, and a servo control unit 90.

The magnetic disk 11 is a storage medium including a magnetic layer and magnetically records data by changing a magnetization state of the magnetic layer. The head 12 includes head elements (a recording element and a reproduction element) at a tip close to the magnetic disk 11. The head 12 writes a data signal in the magnetic disk 11 and reads out a data signal recorded in the magnetic disk 11. The head 12 includes a heater element 121 for adjusting a distance (a protruding flying height) between the head elements and the surface of the magnetic disk 11. When the head elements are thermally expanded by the heater element 121, the protruding flying height decreases.

The head IC 13 includes a not-shown preamplifier and amplifies the data signal read out by the head 12 when data is read out. The VCM 14 adjusts a position of the head 12. The SPM 15 rotates the magnetic disk 11 and adjusts a data readout position by the head 12. The shared bus 16 connects the respective processing units in the magnetic disk device 100 and exchanges various kinds of information among the processing units.

The host-IF control unit 20 is connected to a host, which is a host device of the magnetic disk device 100, and controls communication with the host. The buffer control unit 30 controls the buffer memory 31. The buffer memory 31 temporarily stores information and the like exchanged between the host and the magnetic disk device 100.

The format control unit 40 controls readout of data and performs, for example, error check for the read-out data. The read channel unit 50 amplifies the data signal output from the head IC 13 when the data is read out and applies predetermined processing such as AD conversion and demodulation to the data signal. The RAM 60 and the nonvolatile memory 70 store a firmware program running on the MPU 80 and data for various control.

The MPU 80 performs main control for the magnetic disk device 100 according to a predetermined control program (the firmware program). In other words, the MPU 80 decodes a command from the host, controls the respective processing units, and collectively controls data reading and writing in the magnetic disk 11. In the first embodiment, the MPU 80 controls a protruding flying height by controlling an energization amount applied to the heater element 121. Control processing for an energization amount by the MPU 80 is described in detail later. The MPU 80 may be an MCU (micro controller unit) or a CPU (central processing unit).

The servo control unit 90 drives the VCM 14 and the SPM 15 while checking operation states of the motors, and controls the head 12 to be positioned in a predetermined position on the magnetic disk 11.

Figure 7:
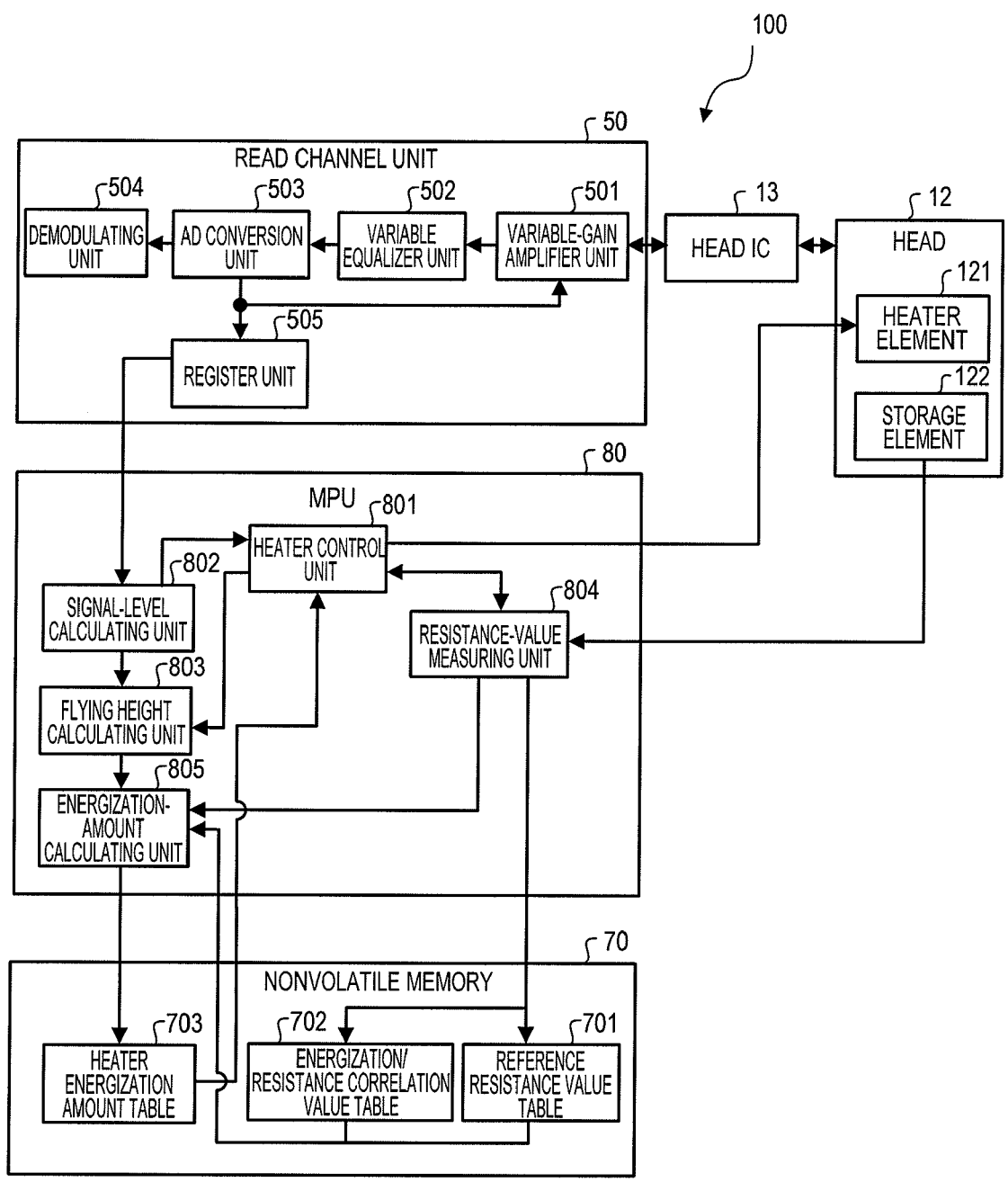
FIG. 7 is a diagram showing a main part configuration of the magnetic disk device according to the first embodiment.

A main part configuration of the magnetic disk device 100 according to the first embodiment will now be explained. FIG. 7 is a diagram showing the main part configuration of the magnetic disk device 100 according to the first embodiment. As shown in FIG. 7, the read channel unit 50 includes a variable-gain amplifier unit 501, a variable equalizer unit 502, an AD conversion unit 503, a demodulating unit 504, and a register unit 505.

The variable-gain amplifier unit 501 includes a variable gain amplifier that can change a gain. The variable-gain amplifier unit 501 sets a gain of the variable gain amplifier according to a gain signal fed back from the AD conversion unit 503 and amplifies a data signal output from the head IC 13. At this point, the variable-gain amplifier unit 501 sets a gain such that a level of the data signal after amplification has a fixed value. In other words, an AGC (auto gain control) loop is formed by the variable-gain amplifier unit 501, the variable equalizer unit 502, and the AD conversion unit 503.

The variable equalizer unit 502 adjusts a frequency characteristic of the data signal after amplification by the variable-gain amplifier unit 501 and outputs an obtained data signal to the AD conversion unit 503. The AD conversion unit 503 AD-converts the data signal outputted from the variable equalizer unit 502 and outputs an obtained digital data signal to the demodulating unit 504. The AD conversion unit 503 generates a gain signal for controlling a gain of the variable-gain amplifier unit 501 from a level of the data signal outputted from the variable equalizer unit 502, feeds back the gain signal to the variable-gain amplifier unit 501, and outputs the gain signal to the register unit 505. The demodulating unit 504 demodulates the digital data signal after the AD conversion and outputs an obtained demodulated signal to the format control unit 40 that performs error check for data.

The register unit 505 temporarily stores the gain signal outputted from the AD conversion unit 503 and supplies the gain signal to a signal-level calculating unit 802. The gain signal stored by the register unit 505 indicates a gain for amplifying a level of the data signal inputted to the variable-gain amplifier unit 501 to a fixed value. The gain is large when a level of a signal read out by the head 12 is small. The gain is small when a level of a signal read out by the head 12 is large. Therefore, it is possible to acquire an output level of a reproduction signal read out by the head 12 from the gain signal stored by the register unit 505.

The nonvolatile memory 70 includes a reference resistance value table 701, an energization/resistance correlation value table 702, and a heater energization amount table 703. The reference resistance value table 701 stores a reference resistance value. The energization/resistance correlation value table 702 stores an energization/resistance correlation value. The reference resistance value and the energization/resistance correlation value are stored by a resistance-value measuring unit 804 described later, when the magnetic disk device 100 is manufactured.

The heater energization amount table 703 stores an initial energization amount and an energization amount during operation applied to the heater element 121 during operation. The initial energization amount is stored by an energization-amount calculating unit 805 described later, during manufacturing. The energization amount during operation is updated by the energization-amount calculating unit 805 during normal operation.

As shown in FIG. 7, the MPU 80 includes a heater control unit 801, a signal-level calculating unit 802, a flying height calculating unit 803, a resistance-value measuring unit 804, and an energization-amount calculating unit 805.

The heater control unit 801 controls an energization amount applied to the heater element 121. Specifically, the heater control unit 801 causes, during manufacturing of the magnetic disk device 100, the servo control unit 90 to control the head 12 to be positioned in a predetermined place on the magnetic disk 11. Then, the heater control unit 801 stepwise increases the energization amount applied to the heater element 121 from 0 [mW] by a predetermined control level (control voltage) and outputs the applied energization amount to the flying height calculating unit 803 and the resistance-value measuring unit 804. At this point, when an output level of a reproduction signal inputted from the signal-level calculating unit 802 at any time does not increase any more and is saturated, the heater control unit 801 reduces the energization amount applied to the heater element 121 to "0".

The heater control unit 801 applies, during normal operation, the energization amount stored in the heater energization amount table 703 to the heater element 121.

The signal-level calculating unit 802 calculates, every time the heater control unit 801 stepwise increases the energization amount applied to the heater element 121, an output level of the reproduction signal read out from the head 12 on the basis of the gain signal supplied from the register unit 505 of the read channel unit 50. The signal-level calculating unit 802 outputs the calculated output level to the heater control unit 801 and the flying height calculating unit 803.

The flying height calculating unit 803 accumulates the output level of the reproduction signal inputted from the signal-level calculating unit 802 and calculates a protruding flying height from the output level of the reproduction signal using the Wallace formula. The flying height calculating unit 803 calculates an energization/protruding amount correlation value by associating the calculated protruding flying height and the energization amount inputted from the heater control unit 801. The flying height calculating unit 803 outputs the calculated energization/protruding amount correlation value to the energization-amount calculating unit 805.

The resistance-value measuring unit 804 measures a resistance value of the storage element 122 and calculates an energization/resistance correlation value. Specifically, the resistance-value measuring unit 804 measures, during manufacturing of the magnetic disk device 100, a resistance value of the storage element 122 every time the heater control unit 801 stepwise increases an energization amount applied to the heater element 121. The resistance-value measuring unit 804 calculates an energization/resistance correlation value by associating the measured resistance value and the energization amount inputted from the heater control unit 801 and stores the calculated energization/resistance correlation value in the energization/resistance correlation value table 702.

The resistance-value measuring unit 804 instructs, during manufacturing of the magnetic disk device 100, the heater control unit 801 to apply an initial energization amount calculated by an energization-amount calculating unit described later to the heater element 121. The resistance-value measuring unit 804 measures a resistance value of the storage element 122 at the time when the initial energization amount is applied to the heater element 121 (a reference resistance value) and stores the measured reference resistance value in the reference resistance value table 701.

The resistance-value measuring unit 804 causes, during normal operation, the servo control unit 90 to control the head 12 to be positioned in an unused area of the magnetic disk 11 in idling in which the magnetic disk device 100 does not perform write processing and read processing. Thereafter, the resistance-value measuring unit 804 instructs the heater control unit 801 to apply the initial energization amount stored in the heater energization amount table 703 to the heater element 121. The resistance-value measuring unit 804 measures a resistance value of the storage element 122 at the time when the initial energization amount is applied to the heater element 121 and outputs the measured resistance value to the energization-amount calculating unit 805.

The "unused area of the magnetic disk 11" in this context indicates an area other than an area of the magnetic disk 11 in which user data and system data are stored. The resistance-value measuring unit 804 preferably controls the head 12 to be positioned in an area on an innermost side (a center side) of the magnetic disk 11, which is not generally a data storage area. The head 12 is controlled to be positioned in the unused area of the magnetic disk 11 to prevent data stored in the magnetic disk 11 from being deleted or changed when a predetermined current is fed to the storage element 122 to measure a resistance value of the storage element 122.

The energization-amount calculating unit 805 calculates an energization amount applied to the heater element 121. Specifically, the energization-amount calculating unit 805 calculates, during manufacturing, an initial energization amount from the energization/protruding amount correlation value inputted from the flying height calculating unit 803 and a target protruding flying height set in advance. The energization-amount calculating unit 805 stores the calculated initial energization amount in the heater energization amount table 703.

When a measured resistance value is inputted from the resistance-value measuring unit 804 in idling during normal operation, the energization-amount calculating unit 805 calculates, using the energization/resistance correlation value stored in the energization/resistance correlation value table 702, an energization amount with which the measured resistance value becomes identical with the reference resistance value stored in the reference resistance value table 701. The energization-amount calculating unit 805 updates the energization amount during operation stored in the heater energization amount table 703 to the calculated energization amount.

Figure 8:
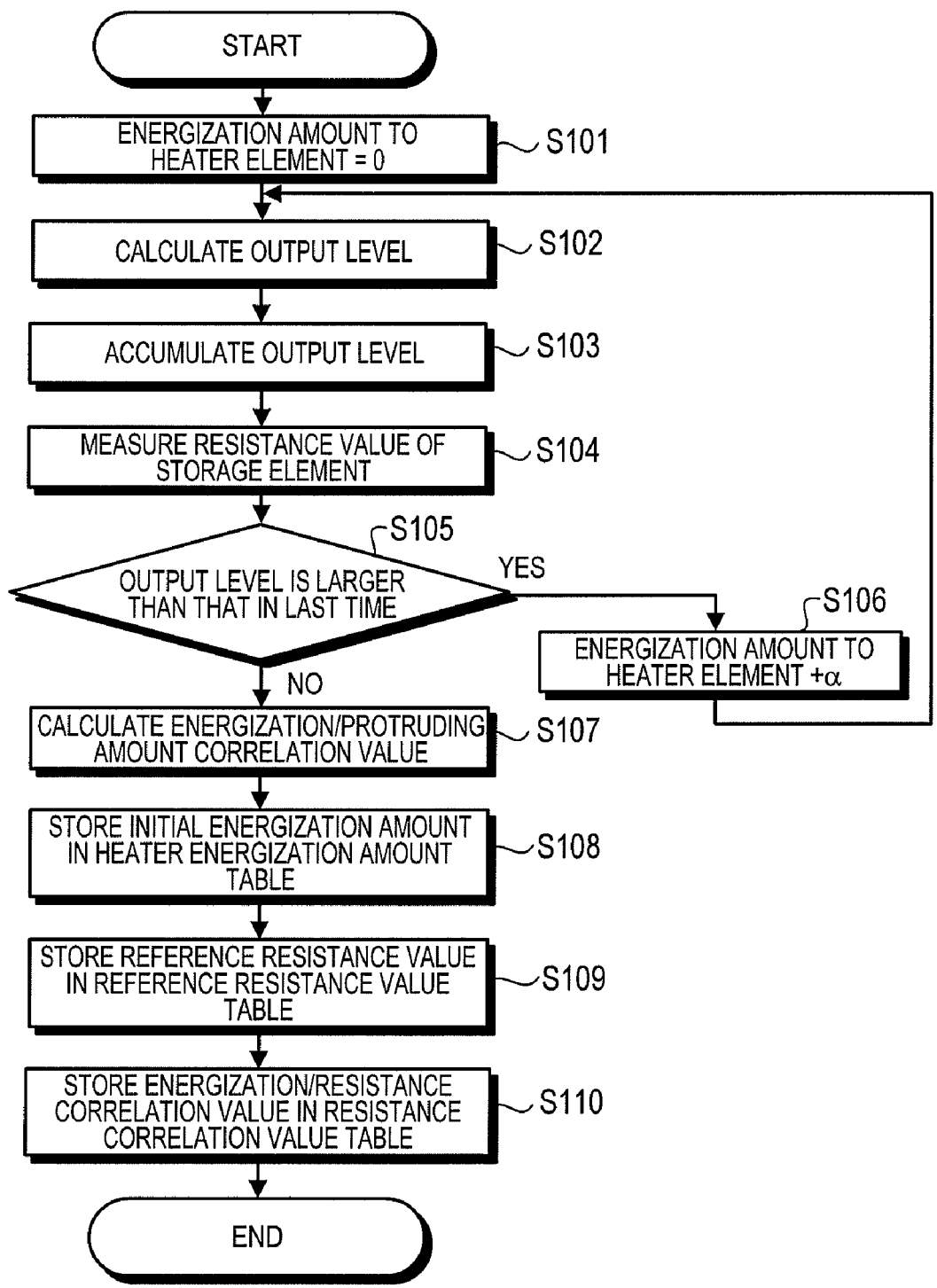
FIG. 8 is a flowchart showing an initial value setting processing procedure by the magnetic disk device according to the first embodiment.

Initial value setting processing by the magnetic disk device 100 according to the first embodiment is explained. FIG. 8 is a flowchart showing an initial value setting processing procedure by the magnetic disk device 100 according to the first embodiment. This processing procedure is performed under a specific environmental temperature during manufacturing of the magnetic disk device 100. The "initial value" in this context indicates the initial energization amount, the reference resistance value, and the energization/resistance correlation value.

As shown in FIG. 8, in a state in which an energization amount is not applied to the heater element 121 by the heater control unit 801 (an energization amount=0) (step S101), the signal-level calculating unit 802 of the magnetic disk device 100 calculates, on the basis of a gain signal supplied from the register unit 505, an output level of a reproduction signal read out in the head 12 (step S102).

The flying height calculating unit 803 accumulates the output level of the reproduction signal calculated by the signal-level calculating unit 802 (step S103). The resistance-value measuring unit 804 measures a resistance value of the storage element 122 in the state in which an energization amount is not applied to the heater element 121 (step S104).

When the output level calculated by the signal-level calculating unit 802 is larger than a previously calculated output level (Yes in step S105), the heater control unit 801 increases the energization amount applied to the heater element 121 by a predetermined control amount (indicated as "α" in FIG. 8) (step S106).

After the energization amount increased by the predetermined control amount by the heater control unit 801 is applied to the heater element 121, the signal-level calculating unit 802 calculates, on the basis of a gain signal supplied from the register unit 505, an output level of a reproduction signal read out in the head 12 (step S102). The flying height calculating unit 803 accumulates the output level (step S103). The resistance-value measuring unit 804 measures a resistance value of the storage element 122 (step S104).

On the other hand, when the output level calculated by the signal-level calculating unit 802 does not increase any more and is saturated (No in step S105), the heater control unit 801 reduces the energization amount applied to the heater element 121 to "0". Thereafter, the flying height calculating unit 803 calculates a protruding flying height from the accumulated output level of the reproduction signal using the Wallace formula, calculates an energization/protruding amount correlation value by associating the calculated protruding flying height and the energization amount input from the heater control unit 801, and inputs the energization/protruding amount correlation value to the energization-amount calculating unit 805 (step S107).

The energization-amount calculating unit 805 inputted with the energization/protruding amount correlation value from the flying height calculating unit 803 calculates an energization amount necessary for increasing the protruding flying height to a target protruding flying height set in advance (an initial energization amount). The energization-amount calculating unit 805 stores the calculated initial energization amount in the heater energization amount table 703 (step S108).

The resistance-value measuring unit 804 instructs the heater control unit 801 to apply the initial energization amount to the heater element 121, measures a resistance value of the storage element 122 at the time when the initial energization amount is applied to the heater element 121 (a reference resistance value), and stores the measured reference resistance value in the reference resistance value table 701 (step S109).

The resistance-value measuring unit 804 calculates an energization/resistance correlation value by associating the resistance value measured every time the heater control unit 801 stepwise increases the energization amount applied to the heater element 121 and the energization amount inputted from the heater control unit 801, and stores the calculated energization/resistance correlation value in the energization/resistance correlation value table 702 (step S110).

Figure 9:
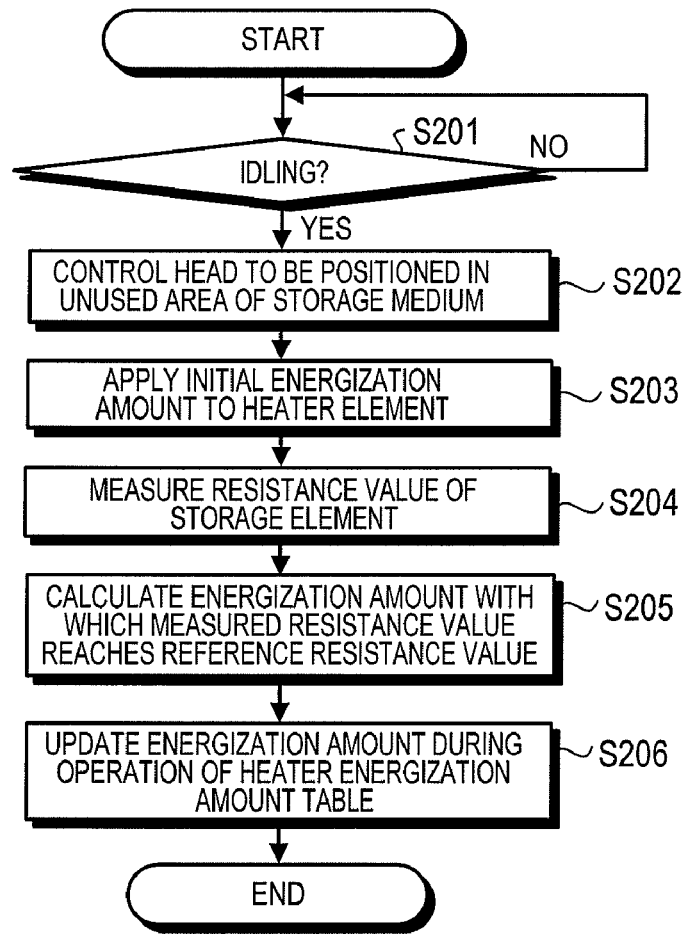
FIG. 9 is a flowchart showing an energization amount calculation processing procedure by the magnetic disk device according to the first embodiment.

Energization amount calculation processing by the magnetic disk device 100 according to the first embodiment is explained. FIG. 9 is a flowchart showing an energization amount calculation processing procedure by the magnetic disk device 100 according to the first embodiment. This processing procedure is performed in idling during normal operation.

As shown in FIG. 9, when the magnetic disk device 100 idles (Yes in step S201) the resistance-value measuring unit 804 of the magnetic disk device 100 causes the servo control unit 90 to control the head 12 to be positioned in the unused area of the magnetic disk 11 (step S202). Thereafter, the resistance-value measuring unit 804 instructs the heater control unit 801 to apply the initial energization amount stored in the heater energization amount table 703 to the heater element 121 (step S203) and measures a resistance value of the storage element 122 at the time when the initial energization amount is applied to the heater element 121 (step S204).

The energization-amount calculating unit 805 calculates, using the energization/resistance correlation value stored in the energization/resistance correlation value table 702, an energization amount with which the resistance value measured by the resistance-value measuring unit 804 (the measured resistance value) reaches the reference resistance value stored in the reference resistance value table 701 (step S205). The energization-amount calculating unit 805 updates the energization amount during operation stored in the heater energization amount table 703 to the calculated energization amount (step S206).

Figure 10:
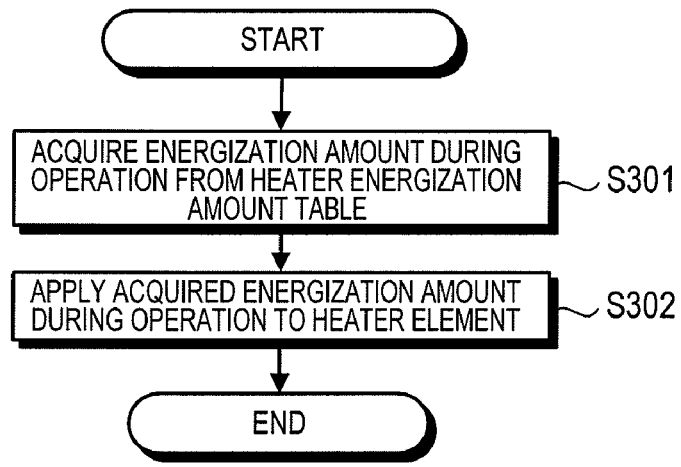
FIG. 10 is a flowchart showing an energization processing procedure by the magnetic disk device according to the first embodiment.

Energization processing by the magnetic disk device 100 according to the first embodiment is explained. FIG. 10 is a flowchart showing an energization processing procedure by the magnetic disk device 100 according to the first embodiment. This processing procedure is performed before write processing or read processing by the magnetic disk device 100.

As shown in FIG. 10, when the magnetic disk device 100 performs write processing or read processing, the heater control unit 801 acquires the energization amount during operation stored in the heater energization amount table 703 (step S301). The heater control unit 801 applies the acquired energization amount during operation to the heater element 121 (step S302).

As described above, the magnetic disk device 100 according to the first embodiment stores the reference resistance value in the reference resistance value table 701 and stores the energization/resistance correlation value in the energization/resistance correlation value table 702. The resistance-value measuring unit 804 measures a resistance value of the storage element 122 when idling during normal operation. The energization-amount calculating unit 805 calculates, using the energization/resistance correlation value, an energization amount with which the measured resistance value becomes identical with the reference resistance value. In performing write processing or read processing, the heater control unit 801 applies the calculated energization amount to the heater element 121. Therefore, it is possible to accurately control, for respective heads, an energization amount applied to the heater element 121 under any temperature environment and maintain a protruding flying height of the head 12 at a target value.

Second Embodiment

In the example explained in the first embodiment, the identical reference resistance value and the initial energization amount are used regardless of a position in a radial direction (hereinafter referred to as radial position) of the head 12 on the magnetic disk 11. However, because of individual variation like a phenomenon called dub-off, in which an end face of a substrate of a magnetic disk sags, depending on a radial position of the head 12 on the magnetic disk 11, an absolute flying height may be different or a protruding amount of the head element may be different even if an identical energization value is applied to the heater element 121. In such a case, in order to highly accurately control a protruding flying height, it is preferable to change the reference resistance value and the initial energization amount according to the radial position of the head.

Therefore, in an example explained in a second embodiment of the present invention, a reference resistance value and an initial energization amount different for each radial position of the head 12 on the magnetic disk 11 are used. A magnetic disk device 200 according to the second embodiment controls the head 12 to be positioned on an inner side, in the center, and on an outer side on the magnetic disk 11, and calculates reference resistance values and initial energization amounts in respective radial positions on the inner side, in the center, and on the outer side. In performing write processing or read processing, the magnetic disk device 200 controls an energization amount applied to the heater element 121 using a reference resistance value and an initial energization amount corresponding to a radial position in which the head 12 is controlled to be positioned.

Figure 11:
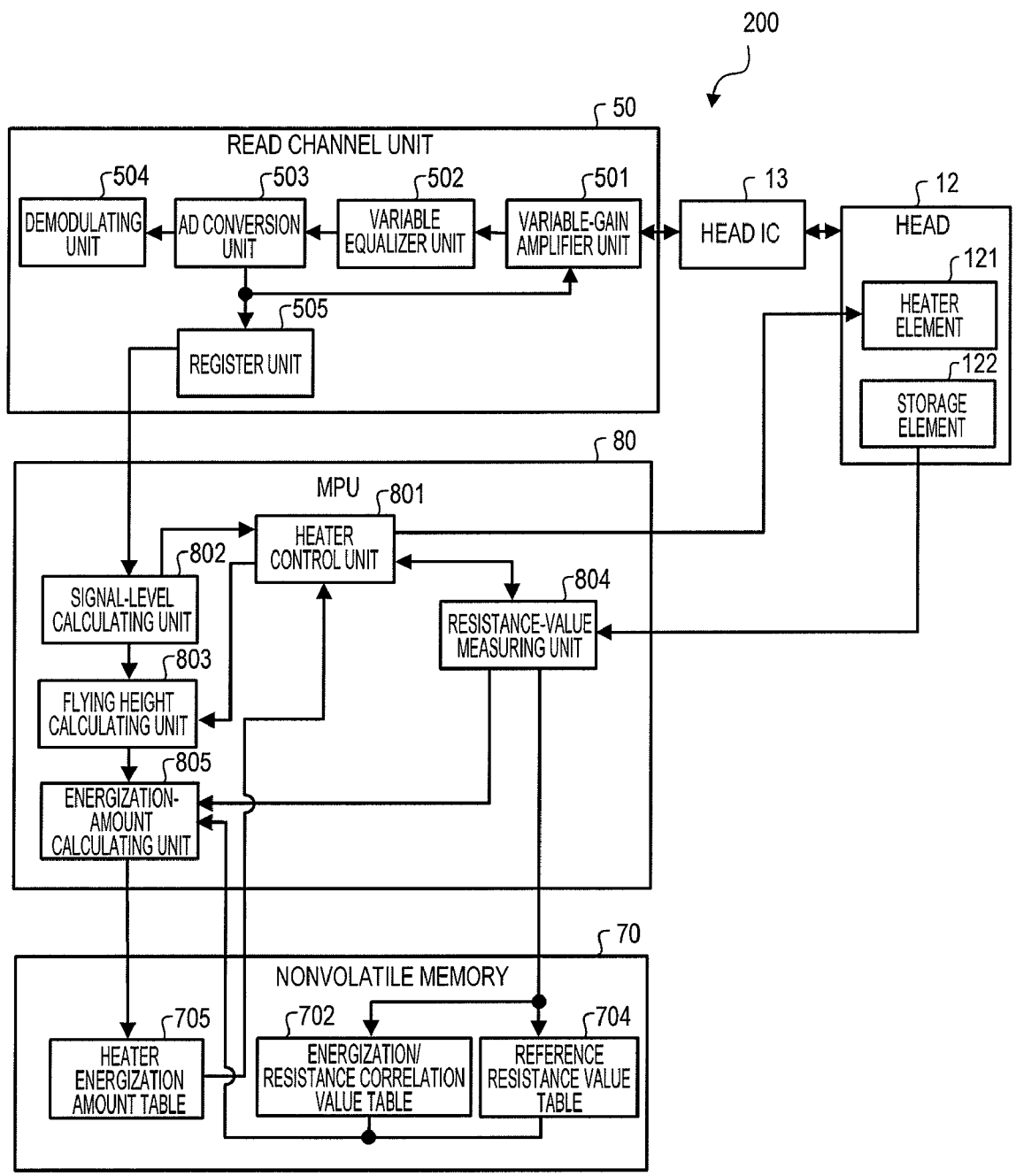
FIG. 11 is a diagram showing a main part configuration of a magnetic disk device according to a second embodiment of the present invention.

FIG. 11 is a diagram showing a main part configuration of the magnetic disk device 200 according to the second embodiment. A schematic configuration of the magnetic disk device 200 according to the second embodiment is the same as the schematic configuration of the magnetic disk device 100 shown in FIG. 6.

As shown in FIG. 11, in the nonvolatile memory 70 of the magnetic disk device 200, the structure of a reference resistance value table 704 and a heater energization amount table 705 is different from the structure of the reference resistance value table 701 and the heater energization amount table 703 according to the first embodiment.

Figures 12, 13, 14:
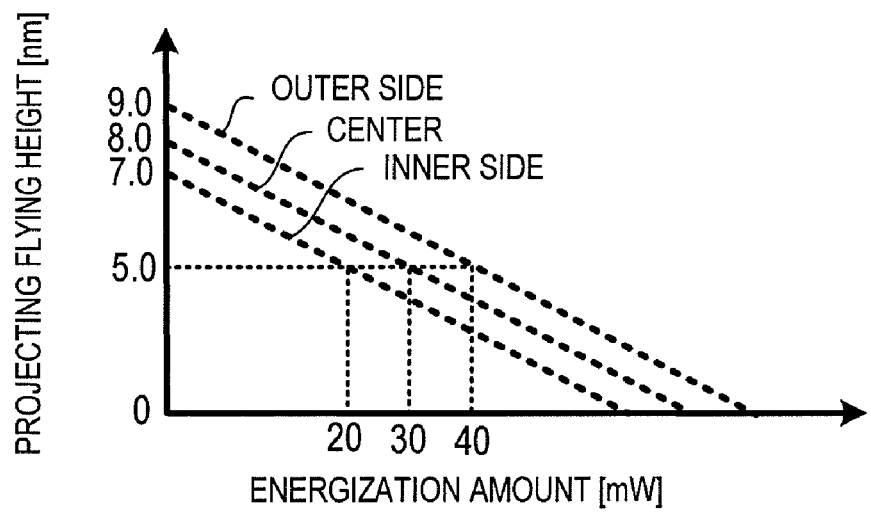
FIG. 12 is a diagram showing an example of a reference resistance value table.
FIG. 13 is a diagram showing an example of a heater energization amount table.
FIG. 14 is a graph showing an example of energization/protruding amount correlation values on the inner side, in the center, and on the outer side of a magnetic disk.

FIG. 12 is a diagram showing an example of the reference resistance value table 704. As shown in FIG. 12, the reference resistance value table 704 stores a "reference resistance value" in association with a "radial position". In the example shown in FIG. 12, when the radial position of the head 12 is the "inner side", the reference resistance value of the storage element 122 is 800 [mOhm]. When the radial position of the head 12 is the "center", the reference resistance value of the storage element 122 is 1000 [mOhm]. When the radial position of the head 12 is the "outer side", the reference resistance value of the storage element 122 is 1200 [mOhm].

FIG. 13 is a diagram showing an example of the heater energization amount table 705. As shown in FIG. 13, the heater energization amount table 703 stores an "initial energization amount" and an "energization amount during operation" in association with a "radial position". In the example shown in FIG. 13, when the radial position of the head 12 is the "inner side", the initial energization amount is 20 [mW] and the energization amount during operation is 35 [mW].

The heater control unit 801 of the magnetic disk device 200 causes, during manufacturing, the servo control unit 90 to control the head 12 to be positioned on the inner side of the magnetic disk 11. Then, the heater control unit 801 stepwise increases an energization amount applied to the heater element 121 from 0 [mW] by predetermined control width and outputs the applied energization amount to the flying height calculating unit 803 and the resistance-value measuring unit 804.

The flying height calculating unit 803 calculates an energization/protruding amount correlation value, calculates an initial energization amount, and stores the calculated initial energization amount in the "initial energization amount" corresponding to the "inner side" of the "radial position" of the heater energization amount table 705.

The resistance-value measuring unit 804 measures a resistance value of the storage element 122 at the time when the initial energization amount on the inner side of the magnetic disk 11 is applied to the heater element 121 (a reference resistance value) and stores the measured reference resistance value in the "reference resistance value" corresponding to the "inner side" of the "radial position" of the reference resistance value table 704.

Similarly, the magnetic disk device 200 calculates an initial energization amount and a reference resistance value in the center or on the outside of the magnetic disk 11. Since an energization/resistance correlation value is fixed regardless of a radial position of the head 12, the energization/resistance correlation value does not need to be measured for each radial position of the head.

FIG. 14 is a graph showing an example of energization/protruding amount correlation values on the inner side, in the center, and on the outer side of the magnetic disk 11. In the example shown in FIG. 14, when the radial position of the head 12 is the inner side, the absolute flying height is 7.0 [nm] and the initial energization amount is 20 [mW]. When the radial position of the head 12 is the center, the absolute flying height is 8.0 [nm] and the initial energization amount is 30 [mW]. When the radial position of the head 12 is the outer side, the absolute flying height is 9.0 [nm] and the initial energization amount is 40 [mW]. In FIG. 13, an example of storage of the initial energization values shown in FIG. 14 is shown.

The resistance-value measuring unit 804 controls, in idling during normal operation, the head 12 to be positioned in a predetermined unused area of the magnetic disk 11, measures a resistance value of the storage element 122, and outputs the measured resistance value to the energization-amount calculating unit 805. Since the resistance value of the storage element 122 does not change according to the radial position of the head 12, the resistance-value measuring unit 804 may control the head 12 to be positioned anywhere in the unused area of the magnetic disk 11.

The energization-amount calculating unit 805 inputted with the measured resistance value from the resistance-value measuring unit 804 acquires the reference resistance value corresponding to the "inner side" of the "radial position" from the reference resistance value table 704 and calculates, using the energization/resistance correlation value, an energization amount with which the measured resistance value reaches the reference resistance value. The energization-amount calculating unit 805 updates the energization amount during operation corresponding to the "inner side" of the "radial position" of the heater energization amount table 705 to the calculated energization amount.

In the example shown in FIGS. 12 and 13, the energization-amount calculating unit 805 acquires the reference resistance value 800 [mOhm] corresponding to the "inner side" of the "radial position" from the reference resistance value table 704. The energization-amount calculating unit 805 acquires the initial energization amount 20 [mW] corresponding to the "inner side" of the "radial position" from the heater energization amount table 705.

When it is assumed that the measured resistance value is 1400 [mOhm] and the energization/resistance correlation value is 40 [mOhm]/1.0 [mW], in order to increase 600 [mOhm] (1400-1000), which is a difference between the reference resistance value and the measured resistance value, the energization-amount calculating unit 805 calculates 35 [mW] by adding 15 [mW] to the initial energization amount 20 [mW]. As shown in FIG. 13, the energization-amount calculating unit 805 updates the energization amount corresponding to the "inner side" of the "radial position" of the heater energization amount table 703 to 35 [mW].

Similarly, when the radial position of the head 12 is the center and the outer side, the energization-amount calculating unit 805 also calculates energization amounts, respectively, and updates the energization amount during operation of the heater energization amount table 705.

The heater control unit 801 adds, in performing write processing or read processing, the energization amount during operation, which is stored in the heater energization amount table 705 in association with the radial position in which the head 12 is controlled to be positioned, to the heater element 121.

In performing write processing or read processing, when the head is controlled to be positioned in, for example, the middle of the "inner side" and the "center" on the magnetic disk 11, the heater control unit 801 may control an energization amount applied to the heater element 121 by linearly interpolating the energization amount. In the example shown in FIG. 13, when the head 12 is controlled to be positioned in the middle of the "inner side" and the "center" on the magnetic disk 11, the heater control unit 801 adds 37.5 [mW], which is an intermediate value between the energization amount during operation 35 [mW] on the "inner side" and the energization amount during operation 40 [mW] in the "center", to the heater element 121.

As described above, the magnetic disk device 200 according to the second embodiment stores initial energization amounts and reference resistance values in association with radial positions (the inner side, the center, and the outer side) of the head 12 on the magnetic disk 11. In idling during normal operation, the resistance-value measuring unit 804 calculates energization amounts corresponding to the respective radial positions of the head 12. Therefore, even when the reference resistance value and the initial energization amount change according to the radial position of the head 12, it is possible to accurately control an energization amount applied to the heater element 121.

In the example explained in the second embodiment, initial energization amounts and reference resistance values are calculated for the radial positions of the head 12 on the inner side, in the center, and the outer side. However, initial energization amounts and reference resistance values may be calculated for radial positions only on the outer side and the inner side or at more than three points or the like.

Third Embodiment

In the examples explained in the first and second embodiments, a resistance value of the storage element 122 is measured and an energization amount applied to the heater element 121 is controlled. In an example explained in a third embodiment of the present invention, an energization amount applied to the storage element 122 is controlled.

The magnetic disk device in the past measures environmental temperature using a thermistor and performs, on the basis of the measured environmental temperature, control of an energization amount applied to the storage element 122, control of overshoot, control of an auxiliary heater, and the like. However, when a temperature gradient of the environmental temperature is steep, it is likely that a temperature difference will occur between the temperature measured by the thermistor and the temperature of a head. That causes a problem in that, for example, the energization amount applied to the storage element 122 cannot be accurately controlled.

Therefore, a magnetic disk device 300 according to the third embodiment detects a change in environmental temperature from an amount of change in a resistance value of the storage element 122 and performs, for example, control of an energization amount applied to the storage element 122 on the basis of the detected environmental temperature. In an example explained below, the magnetic disk device 300 controls only an energization amount applied to the storage element 122. However, the magnetic disk device can also be applied to other kinds of control such as control of overshoot and control of an auxiliary heater.

Figure 15:
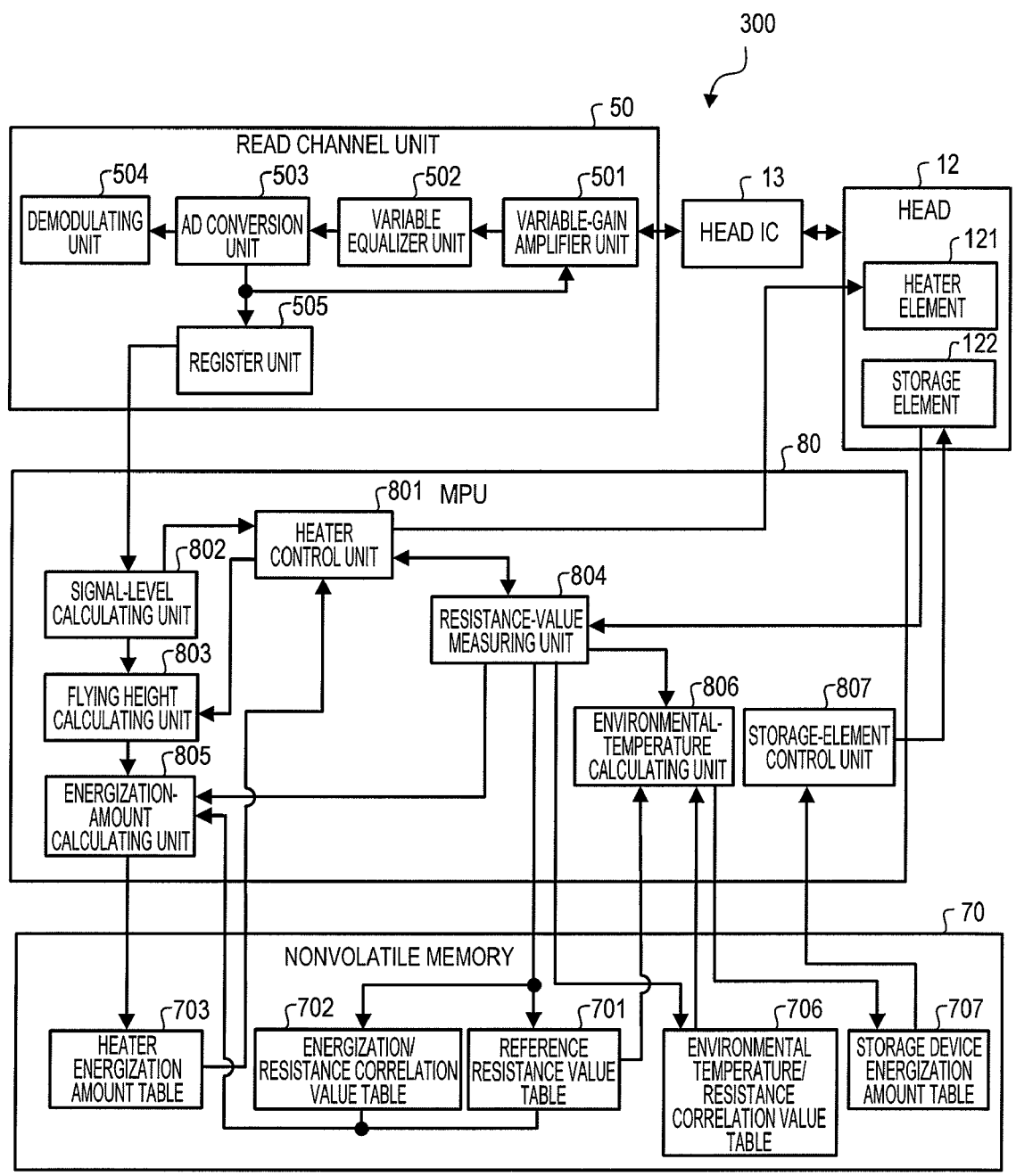
FIG. 15 is a diagram showing a main part configuration of a magnetic disk device according to a third embodiment of the present invention.

FIG. 15 is a diagram showing a main part configuration of the magnetic disk device 300 according to the third embodiment. A schematic configuration of the magnetic disk device 300 is the same as the schematic configuration of the magnetic disk device 100 shown in FIG. 6.

As shown in FIG. 15, the nonvolatile memory 70 further includes an environmental temperature/resistance correlation value table 706 and a storage element energization amount table 707 compared with the nonvolatile memory 70 according to the first embodiment.

Figures 16, 17:
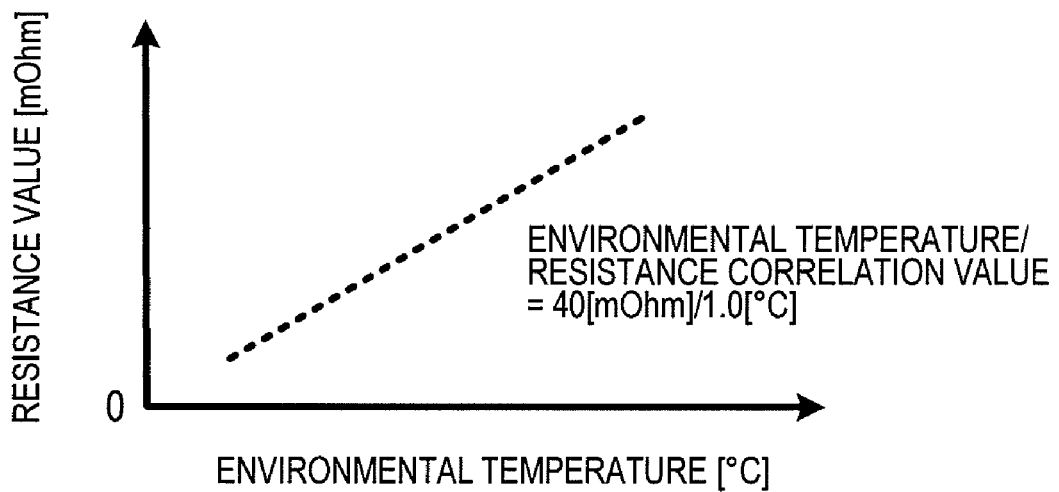
FIG. 16 is a graph showing an example of an environmental temperature/resistance correlation value.
FIG. 17 is a diagram showing an example of a storage element energization amount table.
Figure 18:
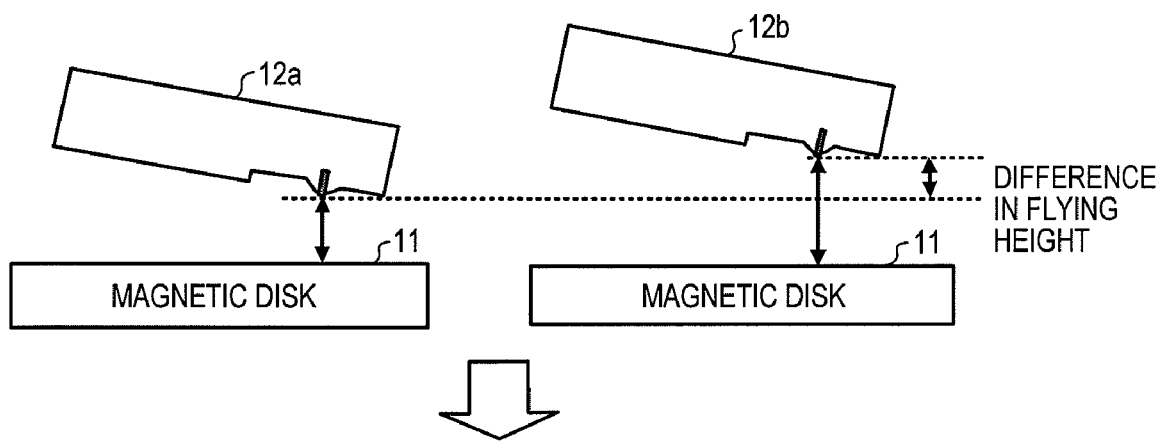
FIG. 18 is a diagram for explaining a method in the past for controlling a flying height.
Figure 18:
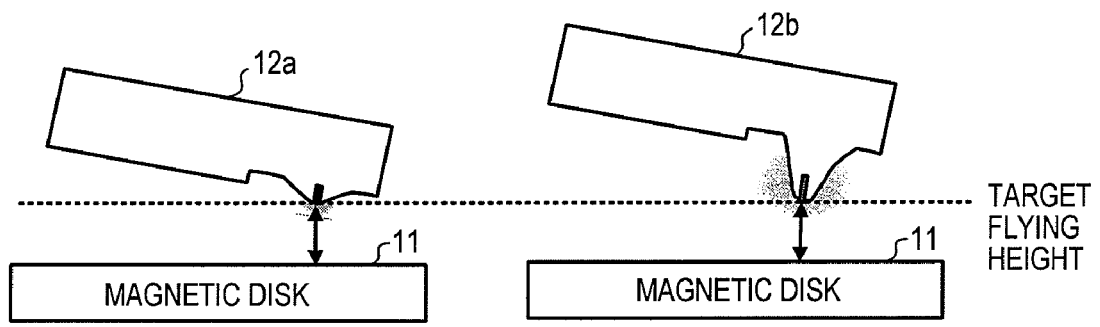
Figure 19:
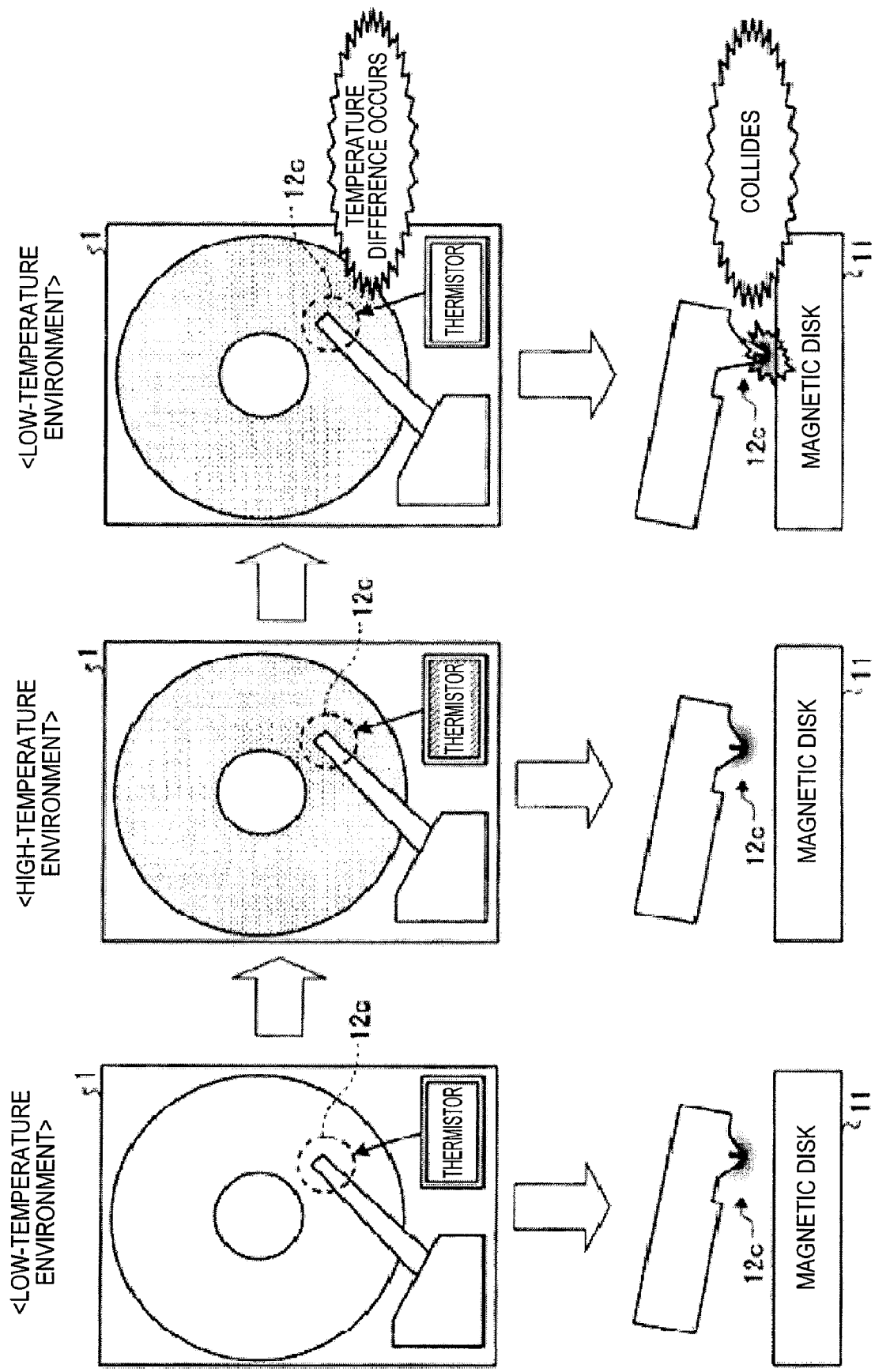
FIG. 19 is a diagram for explaining flying height control processing by a magnetic disk device in the past.

The environmental temperature/resistance correlation value table 706 stores a correlation value between environmental temperature and a resistance value of the storage element 122 (hereinafter referred to as environmental temperature/resistance correlation value). FIG. 16 is a graph showing an example of the environmental temperature/resistance correlation value. In the example shown in FIG. 16, the environmental temperature/resistance correlation value is 40 [mOhm]/1.0 [° C.]. In other words, when the environmental temperature rises by 1 [° C.], the resistance value of the storage element 122 increases by 40 [mOhm].

The environmental temperature/resistance correlation value is calculated by changing, during manufacturing of the magnetic disk device 300, the environmental temperature stepwise with the head 12 unloaded and measuring a resistance value of the storage element 122 using the resistance-value measuring unit 804. The head 12 is unloaded because, when the head 12 is floated above the magnetic disk 11, the heat of the head 12 escapes to the magnetic disk 11 and a resistance value of the storage element 122 with respect to environmental temperature cannot be accurately measured.

The storage element energization amount table 707 stores an energization amount applied to the storage element 122. FIG. 17 is a diagram showing an example of the storage element energization amount table 707. As shown in FIG. 17, the storage element energization amount table 707 stores an "energization amount" and an "effective flag" in association with "environmental temperature". The "effective flag" is a flag for judging which energization amount should be applied to the storage element 122 among "energization amounts" stored in the storage element energization amount table 707. In the example shown in FIG. 17, 15 [mW] corresponding to the effective flag "1" is applied to the storage element 122.

An energization amount applied to the storage element 122 is set variable according to environmental temperature in order to allow the storage element 122 to accurately write data in the magnetic disk 11 even if the environmental temperature changes.

Specifically, the coercive force of the magnetic disk 11 falls as the environmental temperature rises and, when the storage element 122 writes data in the magnetic disk 11, it is likely that an area other than a desired area, such as an adjacent track, will be updated. Therefore, an energization amount applied to the storage element 122 is reduced as the environmental temperature rises to prevent this problem. The coercive force of the magnetic disk 11 increases as the environmental temperature falls and it is likely that the storage element 122 cannot write data in the desired area of the magnetic disk 11. Therefore, an energization amount applied to the storage element 122 is increased as the environmental temperature falls to prevent this problem.

As shown in FIG. 15, the MPU 80 further includes an environmental-temperature calculating unit 806 and a storage-element control unit 807 compared with the MPU 80 according to the first embodiment. When a measured resistance value is inputted from the resistance-value measuring unit 804 when idling during normal operation, the environmental-temperature calculating unit 806 calculates a difference between the measured resistance value and the reference resistance value, and calculates environmental temperature using the environmental temperature/resistance correlation value stored in the environmental temperature/resistance correlation value table 706. The environmental-temperature calculating unit 806 updates the effective flag of the storage element energization amount table 707 such that an energization amount corresponding to the calculated environmental temperature is applied to the storage element 122.

For example, when the measured resistance value is 800 [mOhm] and the reference resistance value is 1000 [mOhm], the environmental-temperature calculating unit 806 calculates a difference 200 [mOhm] between the measured resistance value and the reference resistance value. As in the example shown in FIG. 16, when it is assumed that the environmental temperature/resistance correlation value is 40 [mOhm]/1.0 [° C.], the environmental-temperature calculating unit 806 calculates, as environmental temperature, 20 [° C.] by subtracting 5 [° C.] from the room temperature 25 [° C.] at which the reference resistance value is measured. The environmental-temperature calculating unit 806 updates the effective flag of the storage element energization amount table 707 corresponding to the environmental temperature 20 [° C.] to "1" and updates the effective flag corresponding to the environmental temperature other than 20 [° C.] to "0".

In performing write processing, the storage-element control unit 807 applies an energization amount corresponding to the effective flag "1" stored in the storage element energization amount table 707 to the storage element 122. In the example shown in FIG. 17, an energization amount 15 [mW] corresponding to the effective flag "1" is applied to the storage element 122.

As described above, the magnetic disk device 300 according to the third embodiment stores the environmental temperature/resistance correlation value in the environmental temperature/resistance correlation value table and stores the energization amount in the storage element energization amount table 707 in association with the environmental temperature. In idling during normal operation, the environmental-temperature calculating unit 806 calculates environmental temperature from the measured resistance value and the reference resistance value using the environmental temperature/resistance correlation value and updates the effective flag of the storage element energization amount table 707 such that an energization amount corresponding to the calculated environmental temperature is applied to the storage element 122. The storage-element control unit 807 applies the energization amount corresponding to the effective flag "1" stored in the storage element energization amount table 707 to the storage element 122. Therefore, it is possible to calculate environmental temperature from an amount of change in the resistance of the storage element 122. As a result, even when a temperature gradient of the environmental temperature is steep, it is possible to accurately control an energization amount applied to the storage element 122.

In the examples explained in the first to third embodiments, a resistance value of the storage element 122 is measured in idling during normal operation. However, the resistance value may be measured at other times. For example, the resistance value may be measured immediately before write processing or read processing is performed.

In the examples explained in the first to third embodiments, a change in environmental temperature is detected on the basis of an amount of change in a resistance value of the storage element 122, and an energization amount applied to the heater element 121 and an energization amount applied to the storage element 122 are controlled. However, a change in environmental temperature may be detected on the basis of an amount of change in a "resistance value of the heater element 121". In some cases, the heater element 121 is made of a material such as titanium or tungsten. In such a case, a relation between a change in a resistance value of the heater element 121 and a change in environmental temperature is linear. In other words, like the storage element 122, the heater element 121 is suitably used as a temperature sensor.

In such a case, the magnetic disk device calculates, during manufacturing, a resistance value of the heater element 121 under a specific environmental temperature and in a state in which (a) an energization amount necessary for setting a flying height to a target value (a reference resistance value of the heater element 121) and a correlation value between an energization amount applied to the heater element 121 and (b) a resistance value of the heater element 121 (an energization/resistance correlation value of the heater element 121) are provided. In idling during normal operation, the magnetic disk device measures a resistance value of the heater element 121 and calculates an energization amount using the energization/resistance correlation value of the heater element 121 such that the measured resistance value reaches the reference resistance value of the heater element 121. In performing write processing or read processing, the magnetic disk device applies the calculated energization amount to the heater element 121.

With the head control method disclosed, it is possible to accurately control, for respective heads, an energization amount applied to a heater element under any temperature environment and maintain a protruding flying height of a head at a target value.

When the elements of the head control method, the representation, or arbitrary combination of the elements disclosed are applied to apparatuses, systems, computer programs, recording medium, data structure, and the like, such elements, representation, or the combinations of the elements are effective as other aspects of the present invention.

What is claimed is:

1. A head control method for controlling a protruding flying height, which is a distance between a head having a storage element that is opposed to a storage medium and the storage medium, by applying an energization amount to a heater element in the head to thermally expand the head, the head control method comprising:
   a resistance-value measuring step of measuring a resistance value of the storage element;
   an energization-amount calculating step of calculating an energization amount applied to the heater element such that the resistance value measured in the resistance-value measuring step reaches a reference resistance value, which is a resistance value of the storage element in a state in which an energization amount necessary for setting the protruding flying height to a target value is applied to the heater element under specific environmental temperature; and
   a heater control step of performing control to apply the energization amount calculated in the energization-amount calculating step to the heater element.

2. The head control method according to claim 1, wherein, in the energization-amount calculating step, an energization amount applied to the heater element is calculated by using an energization/resistance correlation value indicating a correlation between the energization amount applied to the heater element and the resistance value of the storage element.

3. The head control method according to claim 1, wherein, in the energization-amount calculating step, a reference resistance value corresponding to a position in a radial direction of the storage medium, from which the head reads out a signal and in which the head writes a signal, is acquired from reference-resistance-value storing means for storing the reference resistance value for each position in a radial direction of the head in the storage medium.

4. The head control method according to claim 1, further comprising:
   an environmental-temperature calculating step of calculating environmental temperature of the head using the resistance value measured in the resistance-value measuring step and an environmental temperature/resistance correlation value indicating a correlation between and the environmental temperature of the head and the resistance value of the storage element; and
   a storage-element control step of acquiring, from storage-element-energization-amount storing means for storing energization amounts applied to the storage element in association with respective environmental temperatures, an energization amount corresponding to the environmental temperature calculated in the environmental-temperature calculating step and performing control to apply the acquired energization amount to the storage element.

5. The head control method according to claim 1, wherein, in the resistance-value measuring step, a resistance value of the storage element is measured after the head is moved to an unused area of the storage medium.

6. A control device that controls a protruding flying height, which is a distance between
   a head having a storage element that is opposed to a storage medium and the storage medium, by applying an energization amount to a heater element in the head to thermally expand the head, the control device comprising:
   resistance-value measuring means for measuring a resistance value of the storage element;
   a energization-amount calculating means for calculating an energization amount applied to the heater element such that the resistance value measured by the resistance-value measuring means reaches a reference resistance value, which is a resistance value of the storage element in a state in which an energization amount necessary for setting the protruding flying height to a target value is applied to the heater element under specific environmental temperature; and
   a heater controlling means for performing control to apply the energization amount calculated by the energization-amount calculating means to the heater element.

7. The control device according to claim 6, wherein the energization-amount calculating means calculates an energization amount applied to the heater element using an energization/resistance correlation value indicating a correlation between the energization amount applied to the heater element and the resistance value of the storage element.

8. The control device according to claim 6, wherein the energization-amount calculating means acquires a reference resistance value corresponding to a position in a radial direction of the storage medium, from which the head reads out a signal and in which the head writes a signal, from reference-resistance-value storing means for storing the reference resistance value for each position in a radial direction of the head in the storage medium.

9. The control device according to claim 6, further comprising:
   environmental-temperature calculating means for calculating environmental temperature of the head using the resistance value measured by the resistance-value measuring means and an environmental temperature/resistance correlation value indicating a correlation between the environmental temperature of the head and the resistance value of the storage element; and
   storage-element controlling means for acquiring, from storage-element-energization-amount storing means for storing energization amounts applied to the storage element in association with respective environmental temperatures, an energization amount corresponding to the environmental temperature calculated by the environmental-temperature calculating means and performing control to apply the acquired energization amount to the storage element.

10. The control device according to claim 6, wherein the resistance-value measuring means measures a resistance value of the storage element after the head is moved to an unused area of the storage medium.

11. A storage device having a control device that controls a protruding flying height, which is a distance between a head having a storage element that is opposed to a storage medium and the storage medium, by applying an energization amount to a heater element in the head to thermally expand the head, the storage device comprising:

reference-resistance-value storing means for storing a reference resistance value, which is a resistance value of the storage element in a state in which an energization amount necessary for setting the protruding flying height to a target value is applied to the heater element under specific environmental temperature; resistance-value measuring means for measuring a resistance value of the storage element;

energization-amount calculating means for calculating an energization amount applied to the heater element such that the resistance value measured by the resistance-value measuring means reaches the reference resistance value stored in the reference-resistance-value storing means; and heater controlling means for performing control to apply the energization amount calculated by the energization-amount calculating means to the heater element.

12. The storage device according to claim 11, further comprising energization/resistance-correlation-value storing means for storing an energization resistance correlation value indicating a correlation between the energization amount applied to the heater element and the resistance value of the storage element, wherein the energization-amount calculating means calculates an energization amount applied to the heater element using the energization resistance correlation value stored in the energization/resistance-correlation-value storing means such that the resistance value measured by the resistance-value measuring means reaches the reference resistance value stored in the reference-resistance-value storing means.

13. The storage device according to claim 11, wherein the reference-resistance-value storing means stores the reference resistance value for each position in a radial direction of the head in the storage medium, and the energization-amount calculating means acquires a reference resistance value corresponding to a position in a radial direction of the storage medium, from which the head reads out a signal and in which the head writes a signal, from the reference-resistance-value storing means.

14. The storage device according to claim 11, further comprising:

environmental-temperature/resistance-correlation-value storing means for storing an environmental/temperature-resistance correlation value indicating a correlation between environmental temperature of the head and a resistance value of the storage element;

storage-element-energization-amount storing means for storing energization amounts applied to the storage element in association with respective environmental temperatures;

environmental-temperature calculating means for calculating environmental temperature of the head using the resistance value measured by the resistance-value measuring means and the environmental-temperature/resistance correlation value stored in the environmental-temperature/resistance-correlation-value storing means; and storage-element controlling means for acquiring an energization amount corresponding to the environmental temperature calculated by the environmental-temperature calculating means from the storage-element-energization-amount storing means and performing control to apply the acquired energization amount to the storage element.

15. The storage device according to claim 11, wherein the resistance-value measuring means determines a resistance value of the storage element after the head is moved to an unused area of the storage medium.

* * * * *